Aug. 8, 1933.      F. E. BESSLER      1,922,012
SWITCH
Original Filed Feb. 19, 1930      3 Sheets-Sheet 1
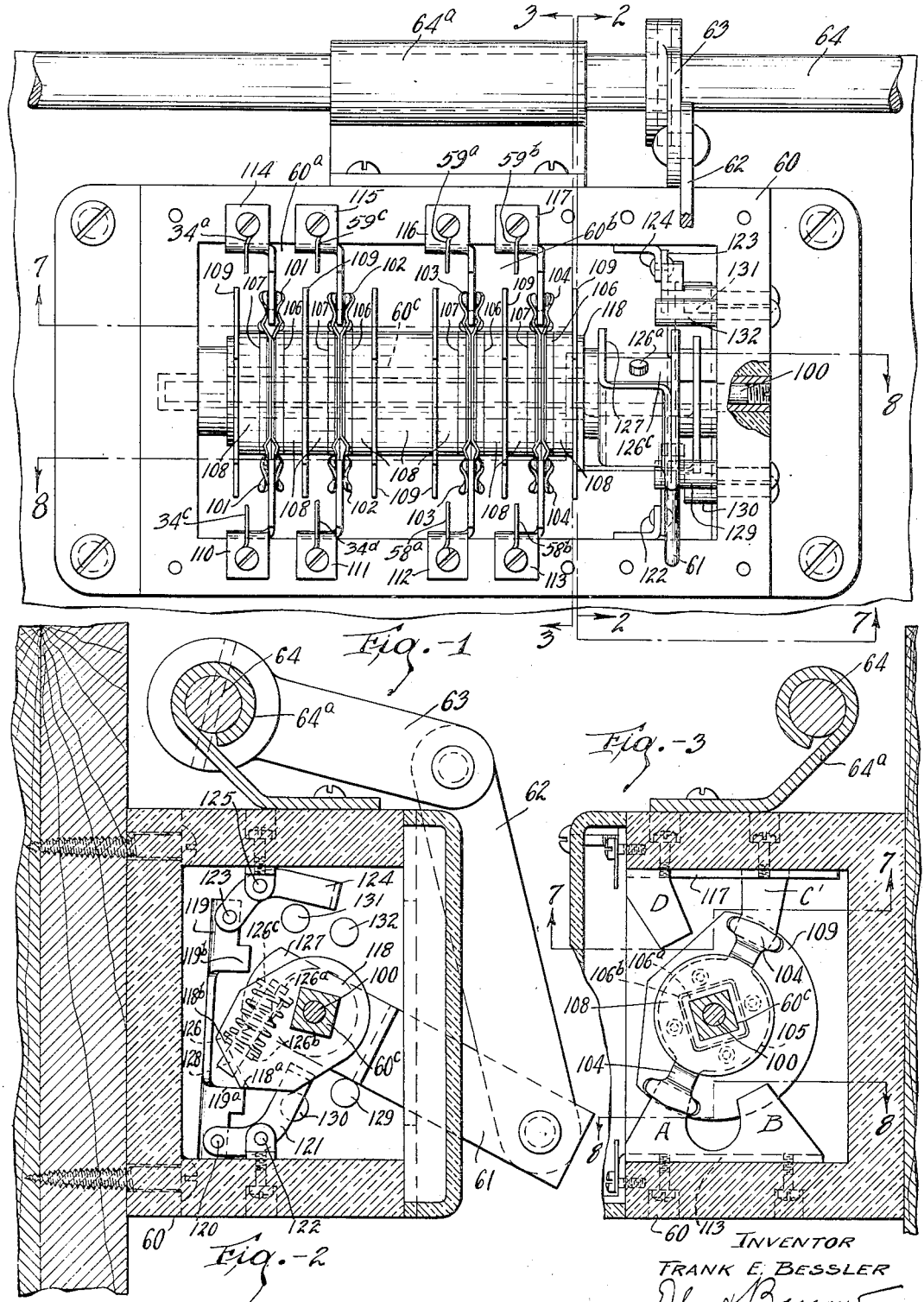
INVENTOR
FRANK E. BESSLER
By Ely & Barrow
ATTORNEYS Aug. 8, 1933.    F. E. BESSLER    1,922,012
SWITCH
Original Filed Feb. 19, 1930    3 Sheets-Sheet 2

INVENTOR
FRANK E. BESSLER
BY
Ely Barrow
ATTORNEYS

Aug. 8, 1933.  F. E. BESSLER  1,922,012
SWITCH
Original Filed Feb. 19, 1930  3 Sheets-Sheet 3

INVENTOR
RANK E. BESSLER
BY
ATTORNEYS

Patented Aug. 8, 1933

1,922,012

UNITED STATES PATENT OFFICE 1,922,012

SWITCH

Frank E. Bessler, Akron, Ohio, assignor to The Bessler Disappearing Stairway Company, Akron, Ohio, a Corporation of Ohio Original application February 19, 1930, Serial No. 429,614. Divided and this application November 6, 1931. Serial No. 573,345

2 Claims. (Cl. 200—67)

This invention relates to switches for controlling apparatus automatically operated by electricity.

The general purpose of the present invention is to provide an improved switch construction for controlling the operation of electric motor-actuated devices such, for example, as the disappearing stairway construction shown and described in application Serial No. 429,614, filed February 19, 1930, of which this application is a division.

The particular purpose of the invention is to provide a switch for such purposes in which arcing is reduced to a minimum.

The foregoing and other purposes of the invention are attained in the switch shown in the accompanying drawings and described below. It is to be understood that the invention is not limited to the specific form thereof shown and described.

Of the accompanying drawings,

Figure 1 is an enlarged elevational view of a stopping and reversing switch such as may be used for controlling an electrically operated disappearing stairway with its cover removed and showing the switch operating device, the parts being shown with the switch in one of its positions;

Figure 2 is a section on line 2—2 of Figure 1;

Figure 3 is a section along line 3—3 of Figure 1;

Figure 9:
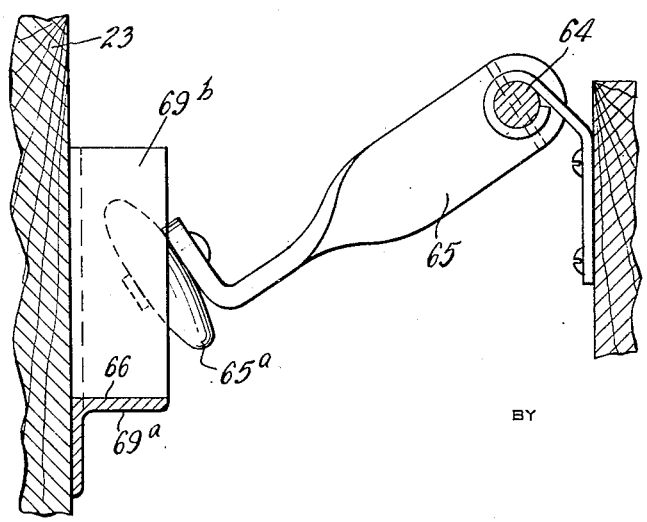
Figure 9 is an enlarged sectional view showing the cooperation of a part of the stairway of the above-mentioned application in cooperation with the operating arm for the switch.

Referring to the drawings, the improved switch construction generally indicated at 60 may include cooperating reversing switches 60$^a$ and 60$^b$. The switches 60$^a$ and 60$^b$ are four-way and arranged as a unit to be simultaneously actuated preferably by a single rock shaft 60$^c$. This shaft may be operable by a crank 61 connected by a pitman 62 with a crank 63 secured on rock shaft 64 as by being journaled in bearing brackets 64$^a$, 64$^a$. This shaft is arranged to be rocked in one direction by movement of the apparatus to be controlled as for example by movement of the stairway of the above-mentioned application to its extended position by provision of an arm 65 thereon on which a roller 65$^a$ may be journaled so as to extend into the path of a cam plate 66 which may be affixed to one side of the stair structure adjacent its upper end, this cam plate having a straight portion 69$^a$ for engaging the roller 65$^a$ to swing arm 65 and an inclined portion 69$^b$ for holding the arm 65 in the position in which it is swung to prevent direct actuation of the switches 60$^a$ and 60$^b$ when the stair structure is extended (see Figure 9).

The rock shaft 64 is also arranged to be rocked in the other direction as the panel of said disappearing stairway swings shut when the stairway is retracted by the provision of means (not shown).

Figure 6:
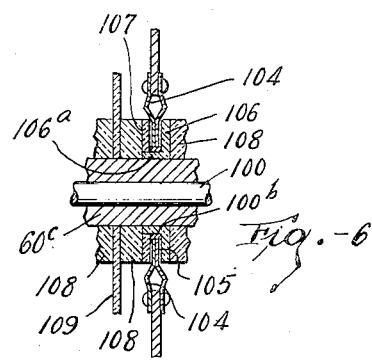
Figure 6 is a section on line 6—6 of Figure 5.

A rock shaft 60$^c$ is journaled on a rod 100 in casing 60 of the switch construction and has non-rotatably mounted thereon pairs of diametrically opposite conductor prongs 101, 102, 103 and 104, which may be formed on conductor discs 105 (Figure 6) clamped between discs 106, 107 of insulating material, one of which may be formed with an integral bushing 106$^a$ to insulate said conductor discs from shaft 60$^c$. A brass bushing 106$^b$ is arranged about the bushing 106$^a$ and supports the discs 106, the space between the discs 106 and 107 being wider than discs 105. A certain freedom of movement of this disc is permitted to allow proper engagement of the prongs 101, 102, 103 or 104 with the terminal plate projection even though these may be slightly out of line. The conductor prongs are spaced along the shaft 60$^c$ by insulating sleeves 108, 108 and enlarged discs 109, 109 of insulating material are secured on the shaft 60$^c$ to embrace the conductor prongs to prevent arcing over.

Figure 7:
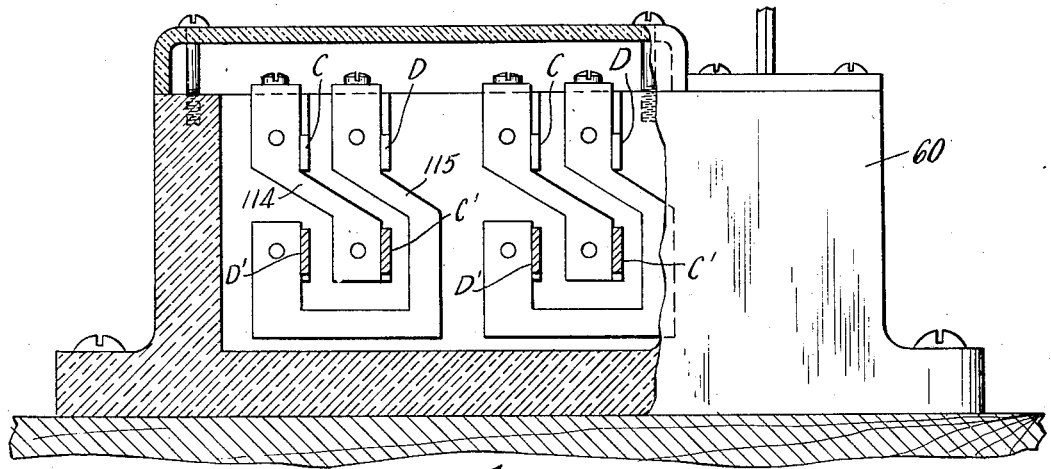
Figure 7 is a section on line 7—7 of Figures 1 and 3.
Figure 8:
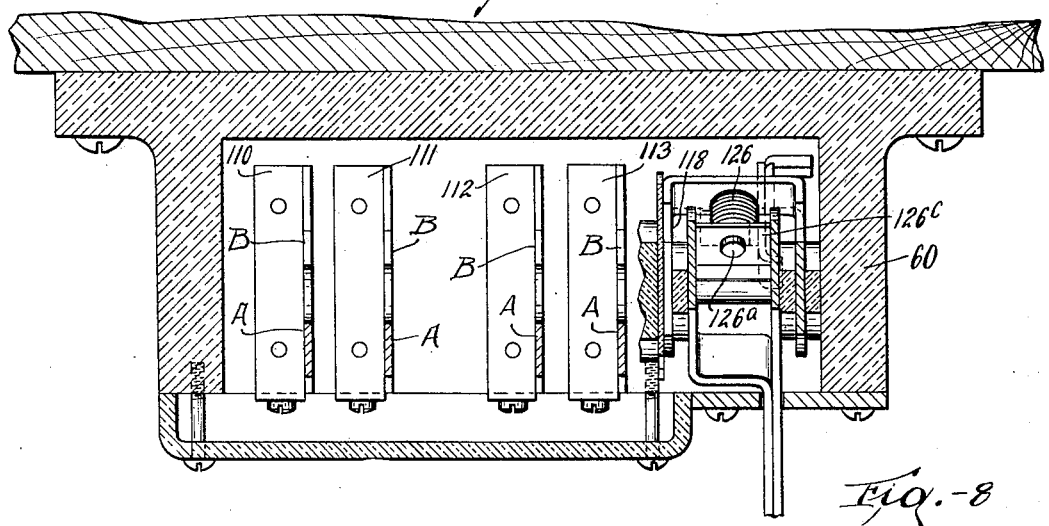
Figure 8 is a section on line 8—8 of Figure 1.

Prongs 101, 102, 103 and 104 are arranged alternately to cooperate with aligned spaced projections A and B on terminal plates 110, 111, 112 and 113 respectively at the bottom of the casing 60 (see Figure 3) and respectively to connect the projections A and B of terminal plates 110 and 111 alternately with projections C and D' and C' and D of terminal plates 114 and 115 and the projections A and B of terminal plates 112 and 113 alternately with projections C and D' and C' and D of terminal plates 116 and 117, terminal plates 114, 115, 116 and 117 being shaped and so provided with projections C' and D' as to present these for engagement by the prongs 101, 102, 103 and 104 in inverse arrangement to projections C and D (see Figure 7).

To rock shaft 60$^c$ between the two positions of the unit, it is provided with an arm 118 secured thereon which is provided with cam edges 118ª, 118ᵇ adapted to be engaged by lugs 119ª and 119ᵇ respectively on a link 119 pivotally connected at one end as at 120 to a bell crank lever 121 pivoted at 122 and pivotally connected at the other end as at 123 to a bell crank lever 124 pivoted at 125.

Crank 61 is freely journaled on rod 100 and has a strong compression spring 126 pivotally connected thereto on an inwardly extending portion 127, the other end of said spring 126 being hingedly mounted on the outer end of arm 118 as at 128. The spring 126 may be supported by a rod 126ª, one end of the spring being against an abutment on the rod as at 126ᵇ, this end of the rod extending loosely through an aperture in the outer end of arm 118, the other end of rod 126ª sliding through a hinge plate 126ᶜ on crank 61 against which spring 126 bears. When crank 61 is down (Figure 2) spring 126 urges arm 118 and link 119 down, a stop pin 129 limiting downward movement of crank 61 and a stop pin 130 limiting downward movement of arm 118. This causes the free end of bell crank lever 121 to extend upwardly and it is arranged to be engaged by the inwardly extending portion 127 of crank arm 61 and to be depressed thereby when the crank 61 is raised.

It will be apparent that as the arm 61 is raised by actuation of rock shaft 64, the end 127 of arm 61 will be depressed and bell crank 121 also will be depressed causing link 119 to be elevated and in turn swinging arm 118 upwardly, this in turn raising the end 126ᵇ of the rod 126ª. The spring 126 accordingly will be compressed as this movement continues until points 127 and 128 approach a dead center position in alignment with the pivot rod 100. This positively starts to disengage the contacts to break any adhesion there may be. Immediately upon movement of the link 119 slightly beyond this dead center position spring 126 quickly and positively rocks arm 118 to its upper position (Figure 4) in which it is held by stop pin 131, a pin 132 being provided also to limit upward movement of crank 61. This effects a quick breaking of the contact at one side and a quick and positive closing of the switch at the other side. Arcing is accordingly reduced to a minimum.

Figures 4, 5:
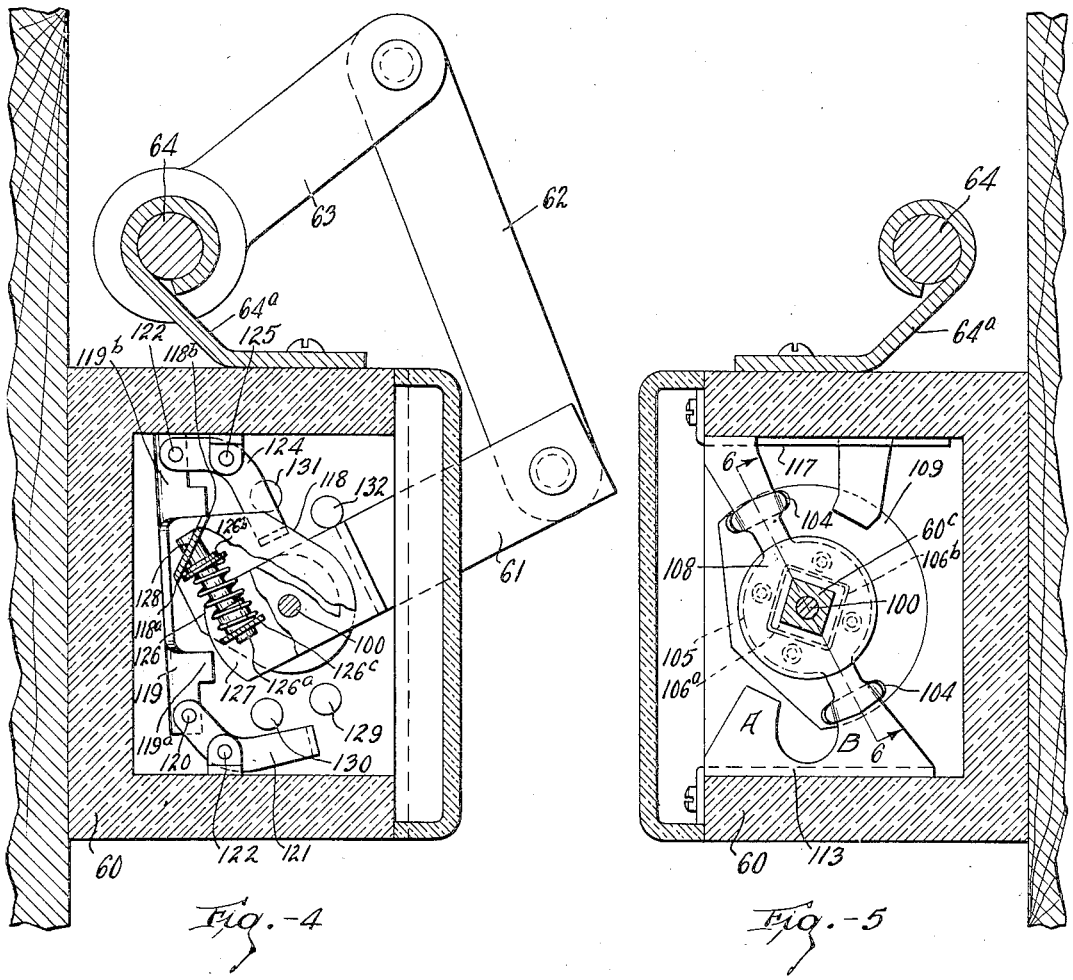
Figure 4 is a view similar to Figure 2 showing the stopping and reversing switch and operating part in the other of its positions.
Figure 5 is a view similar to Figure 3 with the parts in positions corresponding to Figure 4.

It will be apparent that when crank 61 is rocked downwardly from its position in Figure 4 to its position in Figure 2 the reverse of the above operation will take place. It will thus be seen that a set of two four-way switches are combined in a single unit in such a way as to insure simultaneous and positive action thereof for the purpose of accurately controlling the operation of an electrically operated apparatus.

It will be apparent from the foregoing that a simple, effective switch has been provided by the invention. Obvious modifications thereof may be resorted to without departing from the spirit thereof or the scope of the appended claims.

What is claimed is:—

1. A switch including spaced contact elements and a movable contact element operable from one to the other, means including a single shiftable member for engaging said movable contact element for initially and positively moving the movable element to break any adhesion between the movable element and either of said spaced elements, and a single yielding means operable after such initial movement to throw the movable element suddenly from one to the other of the spaced contact elements to break and make contacts quickly whereby arcing is reduced, an arm for operating said yielding means, said single shiftable member having movable members connected thereto for shifting the same, said members being arranged to be engaged by said arm and being free of said movable element to permit such actuation by said yielding means and said yielding means being operable to engage said single shiftable member to set one of the movable members connected thereto in a position to be engaged by said operating arm for a succeeding operation to break the adhesion of contacts after each such throwing of the switch.

2. A switch including spaced contact elements and a movable contact element operable from one to the other, means including a single shiftable member for engaging said movable contact element for initially and positively moving the movable element to break any adhesion between the movable element and either of said spaced elements, and a single yielding means operable after such initial movement to throw the movable element suddenly from one to the other of the spaced contact elements to break and make contacts quickly whereby arcing is reduced, an arm for operating said yielding means, said single shiftable member having movable members connected thereto for shifting the same, said members being arranged to be engaged by said arm and being free of said movable element to permit such actuation by said yielding means and said yielding means being operable to engage said single shiftable member to set one of the movable members connected thereto in a position to be engaged by said operating arm for a succeeding operation to break the adhesion of contacts after each such throwing of the switch, said single shiftable member comprising a link having spaced shoulders thereon between which said movable contact element moves and the movable members connected to said shiftable member comprising levers having fixed pivots, one arm of each lever being connected to said link and the other arm of each lever being arranged to assume a position in the path of said arm to be engaged thereby upon actuation of the arm to break contact of said movable element with one or the other of said fixed contacts.

FRANK E. BESSLER.